United States Patent [19]
Siebler et al.

[11] Patent Number: 5,195,498
[45] Date of Patent: Mar. 23, 1993

[54] TANK-VENTING APPARATUS AS WELL AS A METHOD AND ARRANGEMENT FOR CHECKING THE TIGHTNESS THEREOF

[75] Inventors: Johann Siebler, Fahlenbach; Stephan Pelters, Tiefenbronn; Andreas Blumenstock, Ludwigsburg; Helmut Denz, Stuttgart; Axel-Rene Michelet, Karlsfeld; Siegfried Wesinger, Fürstenfeldbruck; Kurt Almstadt, Wendeburg; Jens Drückhammer, Braunschweig, all of Fed. Rep. of Germany

[73] Assignees: Robert Bosch GmbH, Stuttgart; Audi AG, Ingolstadt; BMW AG, Munich; Dr.Ing.h.c. F. Porsche Aktiengesellschaft, Stuttgart-Zuffenhausen; Volkswagen AG, Wolfsburg, all of Fed. Rep. of Germany

[21] Appl. No.: 854,424

[22] Filed: Mar. 19, 1992

[30] Foreign Application Priority Data

Mar. 19, 1991 [DE] Fed. Rep. of Germany ....... 4108856

[51] Int. Cl.⁵ ...................... F02D 41/14; F02M 33/04; F02M 25/08
[52] U.S. Cl. .................................... 123/698; 123/520
[58] Field of Search ............... 123/518, 519, 520, 698

[56] References Cited

U.S. PATENT DOCUMENTS

| | | | |
|---|---|---|---|
| 4,083,344 | 4/1978 | Sakurai et al. | 123/520 |
| 4,381,753 | 5/1983 | Yuzawa et al. | 123/520 |
| 4,475,522 | 10/1984 | Oonaka | 123/520 |
| 4,658,797 | 4/1987 | Brand | 123/520 |
| 4,664,087 | 5/1987 | Hamburg | 123/698 X |
| 4,887,578 | 12/1989 | Woodcock et al. | 123/520 X |
| 4,967,713 | 11/1990 | Kojima | 123/520 X |
| 5,072,712 | 12/1991 | Steinbrenner et al. | 123/698 X |
| 5,085,194 | 2/1992 | Kuroda et al. | 123/698 X |

Primary Examiner—Willis R. Wolfe
Attorney, Agent, or Firm—Walter Ottesen

[57] ABSTRACT

The invention is directed to a method of checking the tightness of a tank-venting apparatus for a motor vehicle having a fuel tank and an internal combustion engine including a lambda controller and an air intake pipe. The tank-venting apparatus includes an adsorption filter, a supply line interconnecting the adsorption filter and the fuel tank, a connecting line interconnecting the adsorption filter and the intake pipe and a tank-venting valve mounted in the connecting line between the adsorption filter and the intake pipe. The method includes the steps of: measuring the pressure difference between pressure in the tank and ambient pressure; when the tank-venting valve is opened, determining whether the pressure difference increases above a threshold value and whether a lean correction by the lambda controller is required; and, drawing the conclusion that the tank-venting apparatus leaks when neither a lean correction is determined nor the pressure difference exceeds the threshold value. The method is based on the recognition that, when the tank-venting valve is open, either an underpressure must build up in the tank or a lean correction must be determined by the lambda controller based on the fuel vaporizing in the tank. The method is very reliable by simultaneously carrying out these two checks.

4 Claims, 3 Drawing Sheets

TANK-VENTING APPARATUS AS WELL AS A METHOD AND ARRANGEMENT FOR CHECKING THE TIGHTNESS THEREOF

FIELD OF THE INVENTION

The invention relates to a tank-venting apparatus for a motor vehicle having an internal combustion engine as well as a method and an arrangement for checking the tightness of the tank-venting apparatus.

BACKGROUND OF THE INVENTION

It is known that the tightness of a tank-venting apparatus can be checked during operation of the engine equipped with a lambda controller at lower loads. During operation of the engine at lower loads, a check is made as to whether a lean correction via the lambda controller is necessary because of the vapor supplied to the engine from the tank-venting apparatus. This method is unreliable in that it is possible that the fuel in the tank hardly vaporizes. This has as a consequence that, when regenerating the adsorption filter of the apparatus, the air drawn by suction through the filter is not charged with fuel. For this reason, the lambda controller then makes a correction in the direction of rich in order to add fuel to the air supplied from the tank-venting apparatus.

The California Environmental Authority (CARB) suggested in a directive in 1989 to determine with the aid of a fuel-level sensor and a temperature sensor in the tank whether the motor vehicle on which the apparatus is mounted has been tanked or whether the tanked fuel is so warm that a vaporization of the same can be assumed. When the signals of these measuring sensors in the tank indicate that a flow of fuel vapor into the tank-venting apparatus is to be expected, but then nonetheless no lean correction is determined via the lambda control, then this is to be evaluated as an indication for leakage in the tank. This method has the disadvantage that when the temperature, after which vaporization of the fuel is assumed, is selected to be relatively high, no check as to tightness can be carried out for a longer time span during cold weather and with cold fuel. If the above-mentioned temperature threshold is set lower, then the danger is present that an erroneous statement can be made with respect to tightness when no fuel vapor escapes since fuel has been tanked from which vapor no longer emanates. Based on the measurement data of the sensors in the tanks, a vaporization of the fuel is erroneously assumed; however, such vaporization is not present and, accordingly, no lean correction can be made by the lambda controller.

U.S. patent application Ser. No. 768,973, filed on Oct. 8, 1991, pending, discloses a tank-venting apparatus which includes a pressure difference sensor at the tank and an adsorption filter having a venting line which can be blocked. To check the tightness of the tank, the above-mentioned venting line is blocked and a check is then made with the venting valve open as to whether an underpressure has built up in the tank relative to the ambient pressure. If this is the case, the apparatus is then judged as being tight.

In one embodiment of the method, and when the tank-venting valve is opened, a check is made as to a lean correction by the lambda controller when previously (when the tank-venting valve was closed) an overpressure in the tank was determined.

Notwithstanding the foregoing tank-venting apparatus as well as the methods and arrangements for checking the tightness thereof, the task remains to provide methods and arrangements of the above-described type which are improved as well as tank-venting apparatus which can be easily and reliably checked as to tightness.

SUMMARY OF THE INVENTION

The invention relates to a method of checking the tightness of a tank-venting apparatus for a motor vehicle having a fuel tank and an internal combustion engine including a lambda controller and an air intake pipe, the tank-venting apparatus including an adsorption filter, a supply line interconnecting the adsorption filter and the fuel tank, a connecting line interconnecting the adsorption filter and the intake pipe and a tank-venting valve mounted in the connecting line between the adsorption filter and the intake pipe, the method comprising the steps of measuring the pressure difference between the pressure in the tank and the ambient pressure; when the tank-venting valve is opened, determining whether the pressure difference increases above a threshold value and whether a lean correction by the lambda controller is required; and, drawing the conclusion that the tank-venting apparatus leaks when neither a lean correction is determined nor the pressure difference exceeds said threshold value.

The above-mentioned method of the invention is based upon the realization that when fuel in the tank vaporizes relatively little, a relatively high underpressure must adjust when the tank-venting valve is opened and that if this is not the case, the vaporization of the fuel must be determinable via a lean correction of the lambda control assuming that the tank-venting apparatus is tight.

It can be necessary to select the threshold for the above-mentioned underpressure difference relatively low because of the dimensions of the tank-venting apparatus and because of the operating condition of the engine selected for the measurement. In these circumstances, the possibility exists that the underpressure difference can exceed the threshold also because of other disturbing influences. Thus, the underpressure difference can exceed the threshold by chance as well as because of the opening of the tank-venting valve. In order to distinguish between these two conditions, it is advantageous to form a correlation between the opening time spans of the tank-venting valve and the occurrences of when the threshold value is exceeded so that a conclusion as to the tightness of the tank is not drawn already from only one occurrence when the threshold is exceeded; instead, tightness can only then be assumed when the correlation factor exceeds a pregiven value.

In order to obtain the greatest possible differences when opening the tank-venting valve, it is advantageous to so configure the tank-venting apparatus that the supply line from the tank is connected directly to the connecting line leading to the intake pipe and then to provide a branch line (T-shape) into the adsorption filter.

The arrangement according to the invention is for checking the tightness of a tank-venting apparatus for a motor vehicle equipped with an internal combustion engine having a lambda controller. The tank-venting apparatus includes an adsorption filter having a supply line to a tank and a connecting line connected to the intake pipe of the engine. A tank-venting valve is connected into the connecting line between the adsorption filter and the intake pipe.

The arrangement of the invention includes an evaluation device having a terminal to which the actuating signal of the lambda controller is supplied, a terminal to which the signal of a pressure-difference sensor mounted on the tank is supplied as well as a threshold value setting unit for setting a pressure difference threshold value. The evaluation unit is so configured that it supplies a defect signal indicating leakage of the tank when neither the signal from the actuating signal terminal shows a lean correction nor the signal from the pressure difference terminal has exceeded the pressure difference threshold value.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
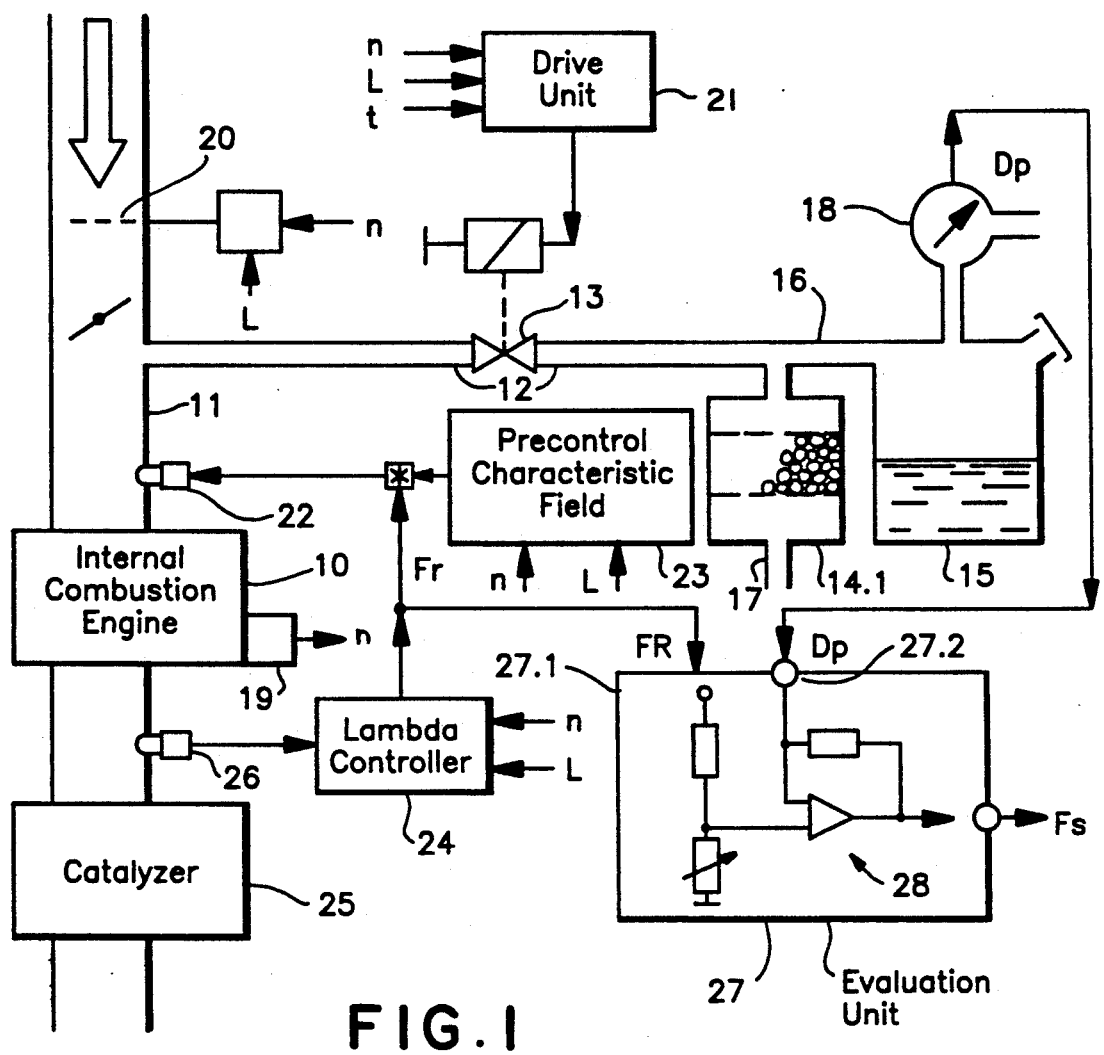
FIG. 1 is a schematic block diagram of a tank-venting apparatus equipped with an arrangement for checking the tightness thereof.

The tank-venting apparatus shown in FIG. 1 is mounted on an internal combustion engine 10 having an intake pipe 11. The tank-venting apparatus includes a connecting line 12 having a tank-venting valve 13 mounted therein between the intake pipe 11 and an adsorption filter 14.1 as well as a supply line 16 leading from the adsorption filter to a tank 15. In the lower portion of the adsorption filter 14.1, a venting line 17 communicates with the filter at its venting end. At the suction end (the top portion of the filter), the filter is connected via a branch line to the connecting line 12 and the supply line 16. The two lines 12 and 16 extend into one another along a straight line. A pressure-difference sensor 18 is mounted on the tank.

An engine-speed sensor 19 is provided on the engine 10 for determining the engine speed (n). An air-flow sensor 20 is provided in the intake pipe 11 for detecting the air mass flowing into the engine. The air-flow sensor supplies a load signal L which, together with the engine speed (n), serves to determine the operating condition of the engine 10. The operating condition is further dependent upon the time (t) in that, in a fixed time pattern, alternately an operation with and an operation without tank venting takes place.

For the operation with or without tank venting, the tank-venting valve 13 is so driven by a drive unit 21 in a known manner that for each operating condition of the engine, a corresponding pulse-duty factor of the valve is set.

Fuel is metered to the engine 10 via a fuel-metering unit 22 which is precontrolled with the aid of values from a fuel-metering precontrol unit 23 and with the aid of a lambda control factor FR and adaptation values which are logically combined with the precontrol values. In FIG. 1, the adaptation variables are not shown; instead, only a multiplicative logic combining of the control factor FR from a lambda controller 24 with the precontrol are shown. The lambda controller 24 also receives a signal from a lambda probe 26 mounted forward of a catalyzer 25.

An evaluation unit 27 includes first and second input terminals 27.1 and 27.2. The actuating signal from the lambda controller 24 is supplied to the first terminal, that is, the control factor FR; whereas, the pressure-difference signal Dp from the pressure-difference sensor 18 is supplied to the second terminal.

A threshold value setting unit 28 is provided within the evaluation unit 27 for setting a pressure-difference threshold value. The evaluation unit 27 supplies a defect signal FS which indicates leakage or clogging of the tank-venting apparatus when neither the signal from the actuating-signal connection 27.1 indicates a lean correction nor the signal from the pressure-difference signal terminal 27.2 exceeds the set threshold value.

Figure 2:
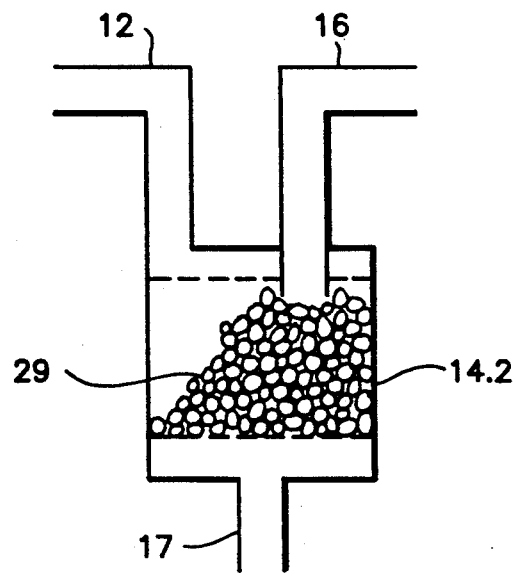
FIG. 2 is a schematic of a connection configuration of an adsorption filter different from the connection configuration shown in FIG. 1.

FIG. 2 shows how the configuration of the tank-venting apparatus and especially how the connection configuration of the adsorption filter can lead to problems with respect to measuring the lean correction and the above-mentioned pressure difference.

The connecting configuration of an adsorption filter 14.2 shown in FIG. 2 includes the supply line 16 which is no longer connected into the connecting line 12; instead, the supply line 16 is introduced into the adsorption filter 14.2 in such a manner that the supply line is partially immersed in the active-charcoal charge 29 of the filter. The supply line 16 is connected to open into the adsorption filter as high as possible or even directly into the connecting line 12 as shown in FIG. 1 to obtain an intense underpressure and therefore a clear measurement signal in the tank 15 with the aid of the difference-pressure sensor 18.

Depending upon the overall dimensioning of the tank-venting apparatus, the danger however exists that a large fuel vapor quantity, which occurs suddenly, can flow very rapidly into the intake pipe 11 because of a vibration of the tank and this can lead to disturbances in the operation of the engine 10. For a combination of tank-venting apparatus and engine which is susceptible to disturbances of this kind, an effort is made to introduce the opening of the supply line 16 into the active-charcoal charge 29 to such an extent that large fuel vapor quantities which occur suddenly are essentially adsorbed on the active charcoal which accordingly functions as a buffer for the fuel vapor flows. According to experiments to date, a slight immersion of the supply line 16 in the active-charcoal charge 29 is sufficient to achieve this buffer action so that the underpressure present at the suction end acts at the opening of this line, for example, 90% of this underpressure.

Figure 3:
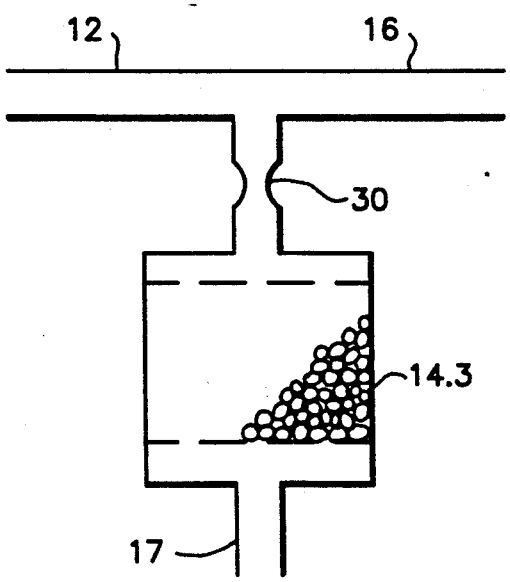
FIG. 3 is a schematic of still another connection configuration of the adsorption filter; and, FIGS. 4 and 5 show flowcharts for describing an embodiment of the method of the invention for checking the tightness of a tank-venting apparatus.

FIG. 2 shows a connection configuration of an adsorption filter 14.2 for the case wherein an engine/tank-venting apparatus combination is sensitive to fuel vapor quantities which occur suddenly while FIG. 3 shows a connection configuration of an adsorption filter 14.3 for the opposite case. In FIG. 3, the pass-through for the connecting line 12 and the supply line 16 to the adsorption filter is made more difficult in that not only is the branch line present as shown in FIG. 1 but there is also a throttle 30 placed in this branch line. In this configuration, the pressure present in the connecting line 12 extends with special intensity into the supply line 16 and each quantity of fuel emanating from the tank is conducted essentially directly into the intake pipe 11 when the tank-venting valve is open.

Figure 4:
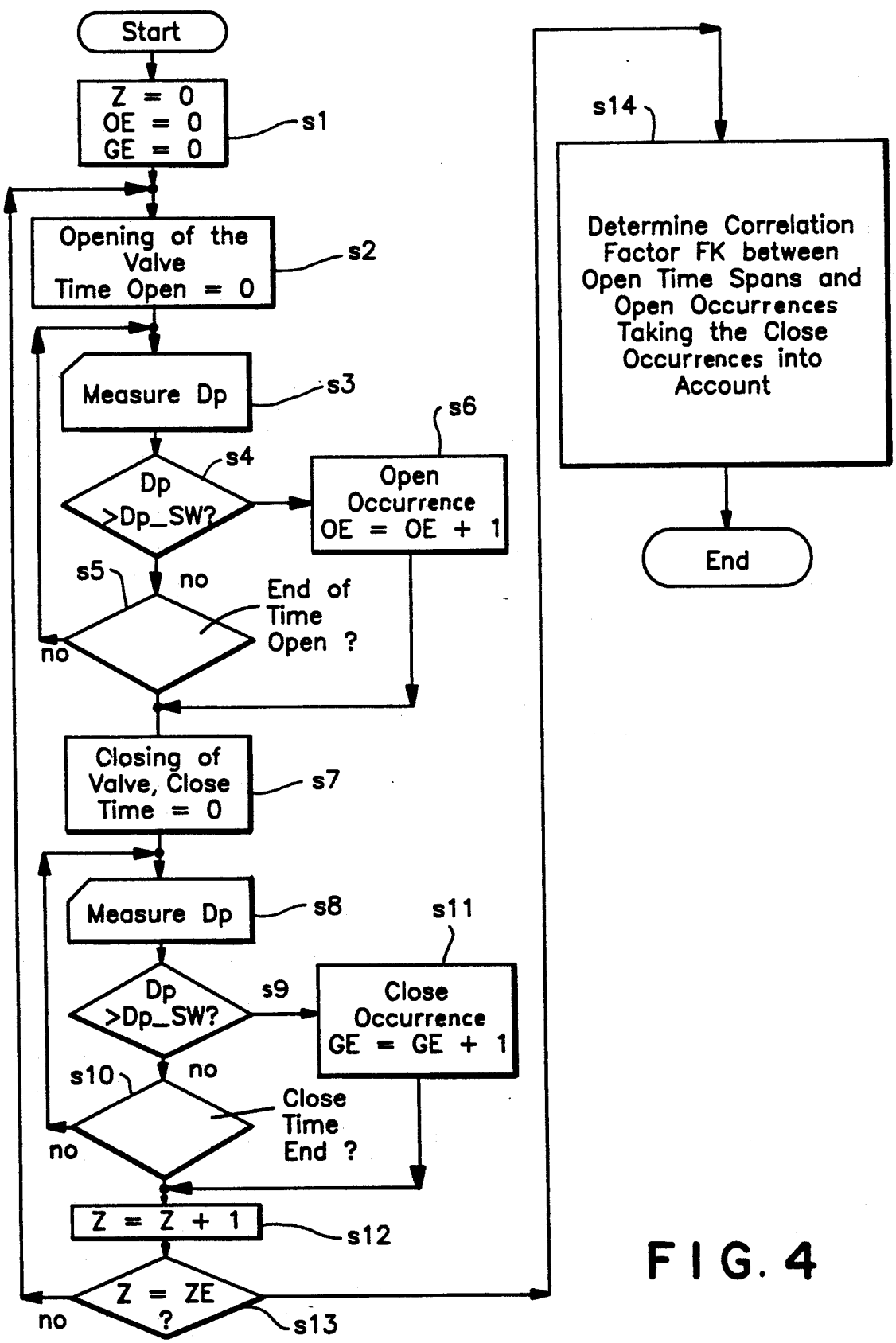
Figure 5:
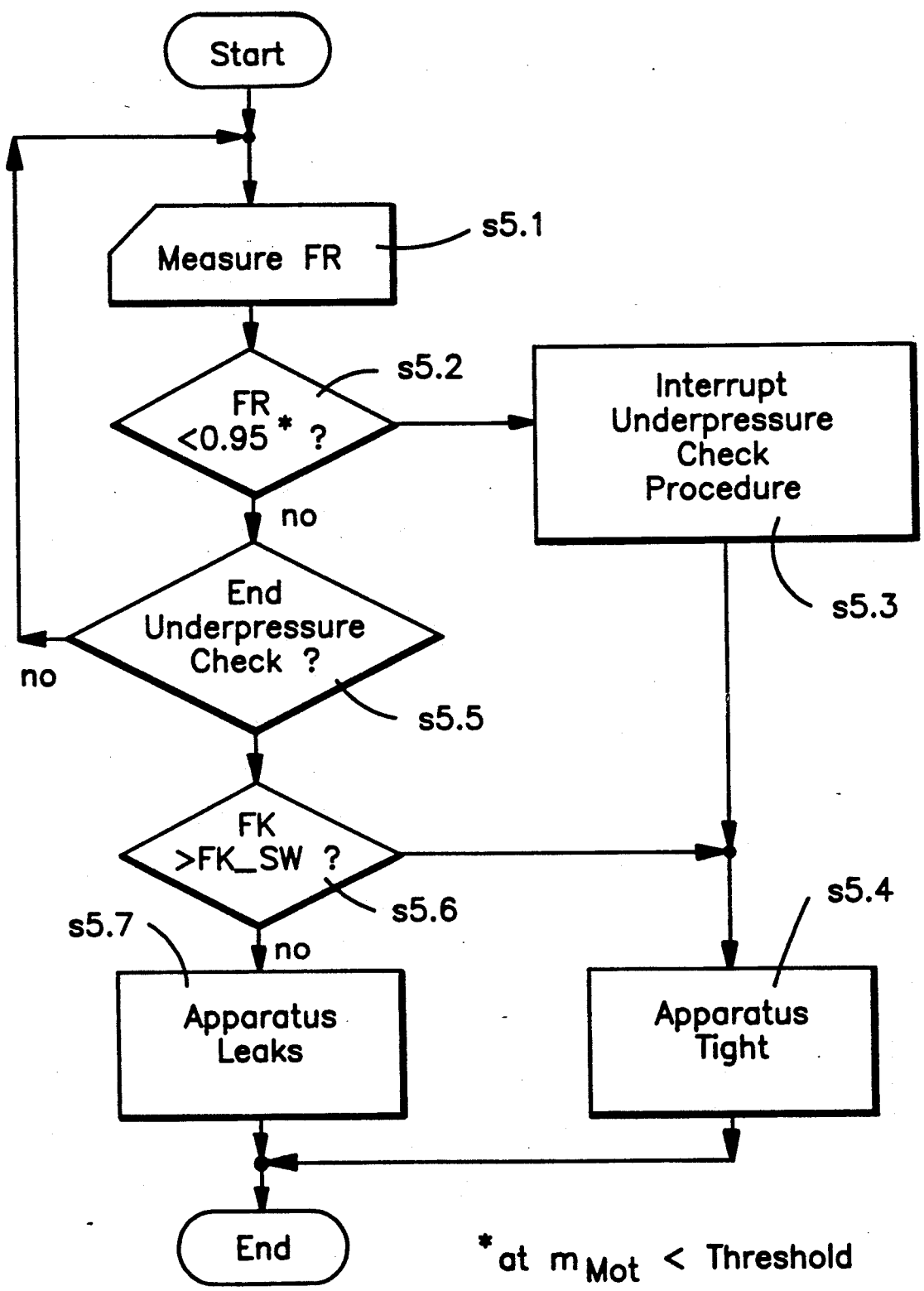

FIGS. 4 and 5 are flowcharts showing the method for checking the tightness of the tank-venting apparatus of FIG. 1. The method is started when an operating condition suitable for the measurements is present and especially an operating region having a high air throughput through the tank-venting valve 13. The method is carried out once during each operating cycle of the motor vehicle on which the tank-venting apparatus is mounted. A driving cycle is understood to be, for example, such a driving cycle of the engine 10 for which a pregiven cooling water temperature is exceeded.

After the method is started, two submethods are started, one for checking the underpressure (FIG. 4) and one for checking the lean correction and for making an overall check (FIG. 5).

In the submethod for the underpressure check, a counter value Z for the open/close-operations of the tank-venting valve, a counter value OE for the open occurrences and a counter value GE for the closed occurrences are each set to zero (step s1). The nature of these occurrences will be explained below. After these initialization measures, the tank-venting valve is opened and an opening time of several seconds up to several multiples of ten seconds is started in dependence upon the dimensioning of the tank-venting apparatus and for the operating region of the engine selected for the measurement (step s2). The pressure difference Dp between the tank inner pressure and the ambient pressure is now measured (step s3) and an inquiry is made as to whether this pressure difference Dp exceeds a threshold Dp_SW. If this is not the case, an inquiry is made as to whether the above-mentioned open time has run (step s5) and, if this is not the case, the steps s3 and s4 are repeated. If it now occurs that the pressure difference Dp exceeds the set threshold, then the counter value OE for opening occurrences is incremented (step s6).

The tank-venting valve is closed following step s6 and a closure time is started (step s7) with these measures also being taken when in step s5, the open time has run without an opening occurrence having been determined. Steps s8 to s11 follow step s7 of which steps s8 and s9 are identical to steps s3 and s4, respectively. Step s10 is different from the step s5 in that the end of the close time is interrogated in lieu of the open time and, when the close time has not yet ended, a return to step s8 occurs and in step s11, the counter GE is incremented as required for close occurrences with a close occurrence then being present when notwithstanding the closed tank-venting valve, the differential pressure Dp exceeds the threshold Dp_SW.

As in step s10, a step s12 follows step s11 when during the close time, no close occurrence occurs wherein the counter value Z is incremented. If it occurs that the counter value Z does not yet reach an end value ZE (step s13), the previously described method steps are repeated. Thus, for example, ten open/close conditions of the tank-venting valve are run through. If the pregiven number is reached, the correlation factor FK is determined between open time spans and open occurrences while considering the close occurrences. For example, if eight open occurrences are determined during ten open time spans but no close occurrence during close time spans is determined, then the correlation factor is set to 0.4. In contrast, if there are also eight close occurrences, then the correlation factor is set to 0.8. The correlation factor amounts then to the number of the open occurrences per open time span plus the number of close occurrences per close time span divided by the sum of the open and close time spans. Any desired other correlation evaluations, even statistical, are possible.

In the parallel submethod for lean correction and the overall check, the low-pass filtered control factor is measured (step s5.1) and a check is made as to whether at engine air throughput $m_{Mot}$ less than threshold, the low-pass filtered control factor has dropped below a threshold of, for example 0.95, which would mean a lean correction (step s5.2). If this is the case, then the method is ended via steps s5.3 and s5.4 wherein the underpressure check is interrupted and the apparatus is judged as being tight. Otherwise, a check is made (step s5.5) as to whether the underpressure check is completed. If this is not the case, the method returns to step s5.1. Otherwise, after step s5.5 is reached again, a check is made (step s5.6) as to whether the correlation factor FK provided in step s14 is greater than a threshold value factor FK_SW of, for example, 0.75. If this is the case, the method is again ended via step s5.4; otherwise, the method is ended via a step s5.7 wherein a defect announcement takes place which announces that the tank-venting apparatus leaks. The defect announcement can, for example, take place by driving a signal lamp and by storing the nature of the defect in a defect memory. When the signal lamp lights, the driver is advised that he should seek a service station and the defect can be there recognized with the aid of the memory entry.

Step s5.4 wherein the announcement is made that the tank-venting apparatus is tight essentially serves only to make clear the method sequence and can be dropped since actually only the indication of the defect case (step s5.7) is of interest. Furthermore, the method described above can be modified in that only a single pressure measurement takes place which is especially then possible when a connection configuration of the adsorption filter according to FIG. 3 is used. Furthermore, in step s5.2, a check can be made as to whether the control factor FR changes in the direction of lean during the tank-venting phase. Any desired lean correction check method can be used.

The tank-venting apparatus, arrangements and methods described above operate with the same reliability as the method described initially with a blockable venting line on the adsorption filter. The configuration of the tank-venting apparatus is however simpler since a drivable blocking valve for the venting line is not necessary and since furthermore no underpressure tank protection valve is required or only a very coarsely dimensioned valve is required.

It is understood that the foregoing description is that of the preferred embodiments of the invention and that various changes and modifications may be made thereto without departing from the spirit and scope of the invention as defined in the appended claims.

What is claimed is:

1. A method of checking the tightness of a tank-venting apparatus for a motor vehicle having a fuel tank and an internal combustion engine including a lambda controller and an air intake pipe, the tank-venting apparatus including an adsorption filter, a supply line interconnecting the adsorption filter and the fuel tank, a connecting line interconnecting the adsorption filter and the intake pipe and a tank-venting valve mounted in the connecting line between the adsorption filter and the intake pipe, the method comprising the steps of:

measuring the pressure difference between the pressure in the tank and the ambient pressure;

when the tank-venting valve is opened, determining whether the pressure difference increases above a threshold value and whether a lean correction by the lambda controller is required; and, drawing the conclusion that the tank-venting apparatus leaks when neither a lean correction is determined nor the pressure difference exceeds said threshold value.

2. The method of claim 1, further comprising the steps of:

opening and closing the tank-venting valve for a pregiven time span a multiple number of times;

continuously checking whether said pressure difference exceeds said threshold value;

forming a correlation between the open time spans of the tank-venting valve and the occurrences of said pressure difference exceeding said threshold value to thereby determine a correlation factor; and, then drawing the conclusion that the tank is tight when the correlation factor exceeds a pregiven value.

3. In a motor vehicle which includes a fuel tank and an internal combustion engine having a lambda controller supplying an actuating signal, an intake pipe and a tank-venting apparatus, the tank-venting apparatus including an adsorption filter, a supply line interconnecting the adsorption filter and the fuel tank, a connecting line interconnecting the adsorption filter and the intake pipe and a tank-venting valve mounted in the connecting line between the adsorption filter and the intake pipe, an arrangement for checking the tightness of the tank-venting apparatus, the arrangement comprising:

a pressure-difference sensor mounted on the fuel tank for measuring the pressure difference between the pressure in the tank and the ambient pressure and for providing a pressure-difference signal;

an evaluation unit having a first terminal for receiving said actuating signal and a second terminal for receiving said pressure-difference signal;

said evaluation unit further having a threshold value setting device for setting an underpressure threshold value; and, said evaluation unit being adapted to provide a defect signal indicating a leak of the fuel tank when neither said actuating signal from said first terminal indicates a lean correction nor said pressure-difference signal from second terminal exceeds said threshold value set by said setting device.

4. A tank-venting apparatus for an internal combustion engine having an intake pipe and being equipped with a fuel tank, the tank-venting apparatus comprising:

an adsorption filter having a suction end at which a suction end pressure is present;

a connecting line connecting said suction end to said intake pipe;

a supply line connecting said adsorption filter to said fuel tank;

a tank-venting valve connected into said connecting line;

a pressure-difference sensor mounted on said fuel tank for measuring the pressure difference between pressure in said fuel tank and ambient pressure for providing a signal indicative of said pressure difference; and, said supply line having an end portion introduced into said adsorption filter in a manner to cause said suction end pressure to be present at said end portion of said supply line.

* * * * *